US006170370B1

(12) United States Patent
Sommerville

(10) Patent No.: US 6,170,370 B1
(45) Date of Patent: Jan. 9, 2001

(54) CIRCULAR SAW SPLITTER DEVICE WITH INTEGRAL ANTI-KICK BACK

(75) Inventor: Thomas R. Sommerville, Port Perry (CA)

(73) Assignee: Sommerville Design & Manufacturing Inc., Pickering (CA)

( * ) Notice: Under 35 U.S.C. 154(b), the term of this patent shall be extended for 0 days.

(21) Appl. No.: 09/347,654

(22) Filed: Jul. 6, 1999

Related U.S. Application Data

(60) Provisional application No. 60/097,032, filed on Aug. 19, 1998.

(51) Int. Cl.[7] .................................................... B23D 19/00

(52) U.S. Cl. .................. 83/102.1; 83/698.11; 409/409.1; 409/DIG. 8

(58) Field of Search .................................. 83/102.1, 827, 83/823, 698.11, DIG. 1; 403/409.1, DIG. 8, DIG. 12

(56) References Cited

U.S. PATENT DOCUMENTS

| | | | |
|---|---|---|---|
| 129,193 | | 7/1872 | Tompkins . |
| 421,861 | | 2/1890 | French . |
| 2,530,867 | | 11/1950 | Galanga . |
| 3,566,934 | | 3/1971 | Thrasher . |
| 3,583,450 | * | 6/1971 | Gunnerman .......................... 83/102.1 |
| 4,625,604 | | 12/1986 | Handler et al. . |
| 4,976,566 | * | 12/1990 | Yeomans ........................... 403/409.1 |
| 5,492,043 | * | 2/1996 | Badillo .............................. 83/698.11 |

* cited by examiner

*Primary Examiner*—W. Donald Bray
(74) *Attorney, Agent, or Firm*—Ratner & Prestia

(57) ABSTRACT

A device for securing a table saw accessory downstream of a saw blade. The device comprises a mount for securing the device to a table saw beneath a throat plate of table saw; a slide for receiving a stem carrying a table saw accessory; a releasable detent for capturing such stem and holding a table saw accessory in place; and an actuator for releasing the detent. The actuator is actuated from directly above and moveable downwardly vertically to release the detent. The device is particularly suited to quick change of saw splitter devices.

21 Claims, 7 Drawing Sheets

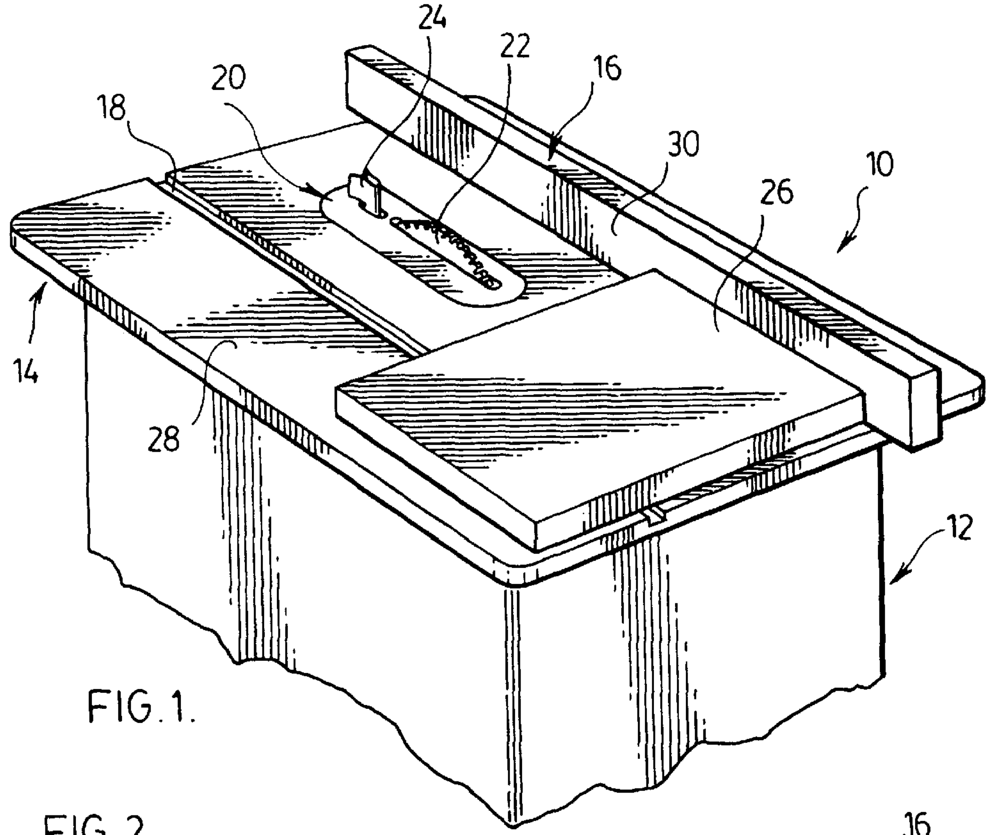
FIG. 1.
FIG. 2.
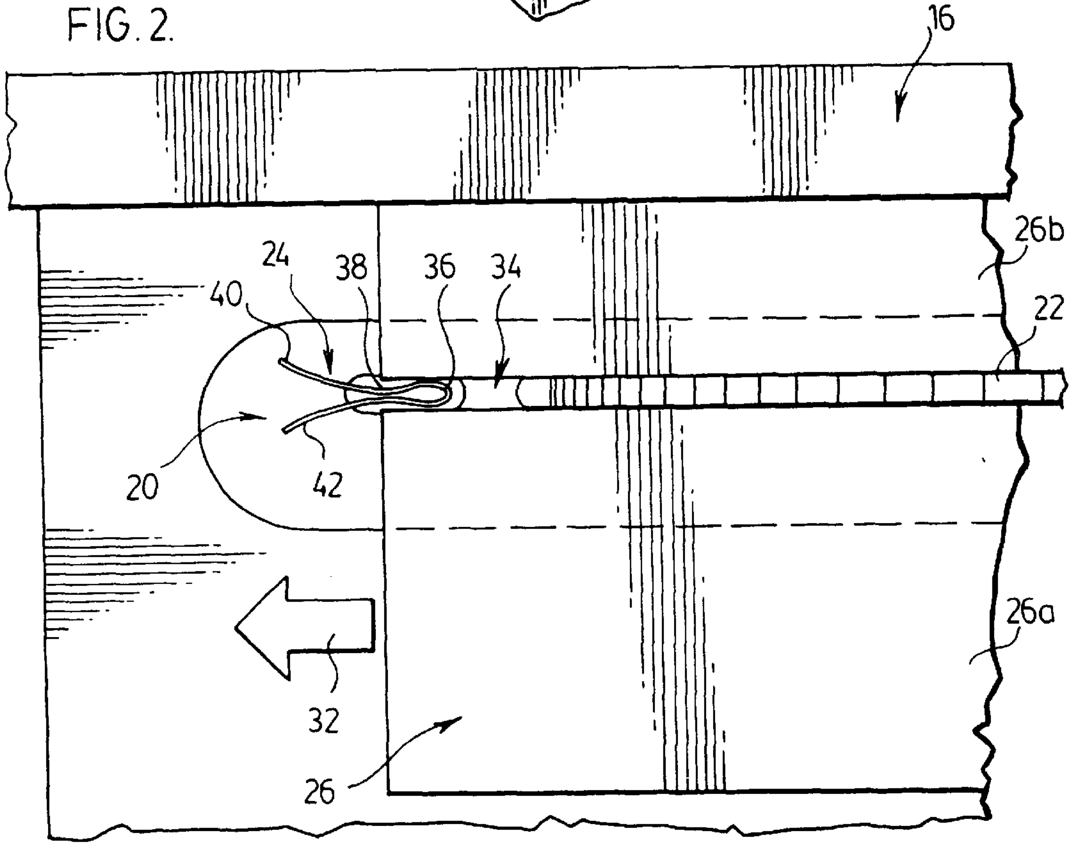

CIRCULAR SAW SPLITTER DEVICE WITH INTEGRAL ANTI-KICK BACK

This application claims the benefit of Provisional Application No. 60/097,032 filed Aug. 19, 1998.

FIELD OF THE INVENTION

This invention relates to spreader devices with integral anti-kickback feature and more particularly spreader devices used with various types of circular saws including table saws.

BACKGROUND OF THE INVENTION

A typical splitter and blade guard assembly for a table saw is shown in U.S. Pat. No. 4,625,604. The blade guard covers the blade and downstream of the blade is a splitter device which maintains separation of the cut material by virtue of its location in the kerf. Separately of the splitter device are downwardly directly pawls which contact the surface of the workpiece and which function to prevent kickback of the workpiece should it get caught up in the saw blade. Although this system is capable of functioning very well in providing splitter and anti-kickback features, the device lacks universality in accommodating various saw blade widths, is complex in construction and mars the upper finish of the workpiece due to the pawls being biased downwardly onto the workpiece upper surface. Other types of splitter devices are shown, for example, in U.S. Pat. No. 2,530,867. The splitter device 38 is hook shaped and has a beveled edge 39 which is machined or ground therein. The device is pivotal from an operative position to a storage position. The device is of a fixed thickness and, hence, cannot readily accommodate varying thickness in saw blades, particularly in respect of the newer ultrathin laser cut carbide tipped saw blades.

U.S. Pat. No. 129,193 describes a splitter device having pivotal flaps. The pivotal flaps are mounted on an upright nose and has pivotal flanges which are set to a width less than the thickness of the saw cut so that the flanges may run free in the lumber without necessary friction and hence consuming less power.

U.S. Pat. No. 421,861 describes a fixed splitter which also functions as a back guard for the saw blade. Teeth are formed in the rear arch portion of the back guard which provide a splitter function in separating the cut pieces of wood where the chisel edges of the teeth may intercept and catch sawed material.

U.S. Pat. No. 3,566,934 shows a splitter device with opposing longitudinally offset resilient contacts which fit within the kerf defined by the saw blade cut. The resilient contacts, however, do not provide an anti-kickback feature because the wood can slide past the offset teeth. However, kickback is not a concern with this type of veneering saw where blade multiples are positioned one adjacent the next.

There continues to be a demand for a simply constructed, readily installed and quickly removable or changeable splitter device with integral kickback feature and which may be universally mounted on any type of table saw.

SUMMARY OF THE INVENTION

According to an aspect of the invention, there is provided, a device for securing a table saw accessory downstream of a saw blade, the device comprises:

i) a mount for securing the device to a table saw beneath a throat plate of table saw;

ii) a slide for receiving a stem carrying a table saw accessory;

iii) a releasable detent for capturing such stem and holding a table saw accessory in place;

iv) an actuator for releasing the detent, the actuator being actuated from directly above and moveable downwardly vertically to release the detent.

According to another aspect of the invention, there is provided, a splitter for use on a table saw comprises a bulging nose portion, a reduced intermediate portion and outwardly biased, outwardly flared opposing wing portions for continuously engaging sides of a saw kerf in a workpiece.

BRIEF DESCRIPTION OF THE DRAWINGS

Various embodiments of the invention are described with respect to the drawings wherein:

FIG. 1 is a perspective view of a table saw showing the splitter device in position downstream of the saw blade;

FIG. 2 is a top view plan view of the splitter device and table saw;

DETAILED DESCRIPTION OF THE PREFERRED EMBODIMENTS OF THE INVENTION

Figure 3:
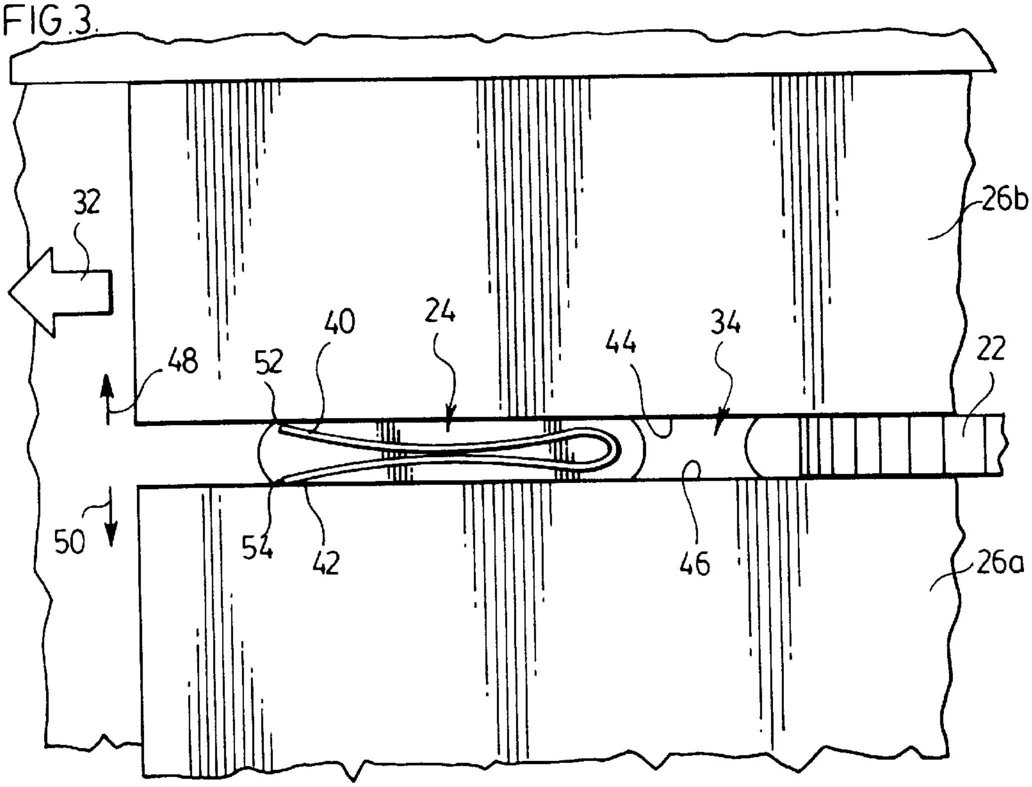
FIG. 3 is a an enlarged view of FIG. 2 showing the splitter device positioned within a saw kerf.

A preferred application of the device for securing table saw accessories downstream of the saw blade are described in respect of a table saw 10 having a base 12 with table top 14. The table top has the usual adjustable fence 16 and the at least one channel 18 for receiving the guide rail of a miter (not shown). The table top has the usual throat plate 20 with saw blade 22 projecting there through. In accordance with a particular aspect of the invention the accessory securing device is used to position a splitter device 24 downstream of the saw blade 22. A workpiece 26 is positioned on the upper surface 28 of the table against the inner guide edge 30 of the fence 16. As usual the workpiece 26 may be slid along the table top surface 28 and as guided by the inner edge 30 of the fence is cut by the saw blade 22.

This cutting action is shown in FIG. 2 where the workpiece 26 is advanced in direction of arrow 32 whereby the saw blade 22 cuts the workpiece 26 into portions 26A and 26B where the usual saw kerf generally designated 34 is provided between separate workpieces 26A and 26B downstream of the saw blade 22. The splitter device 24 is positioned in the throat plate 20 and in alignment with the saw blade 22 so that the splitter device enters the kerf 34. The splitter device 24 has a leading nose portion 36, a reduced intermediate portion 38 and outwardly biased outwardly flared opposing wing portions 40 and 42. As shown in FIG. 2 the nose portion as it enters the kerf 34 maintains separation of the cut pieces 26A and 26B as the workpiece 26 is advanced along the top of the table saw. As shown in FIG. 3 continued advance of the workpiece in direction of arrow 32 continues to cut the workpiece into portions 26A and 26B hence lengthening the kerf 34. The kerf 34 is defined by opposing sawed edges 44 and 46. As the workpiece is advanced and the splitter device 24 is correspondingly advanced into the kerf 34, the wings 40 and 42 are slightly compressed by engagement with the kerf sides 44 and 46. Correspondingly the wings 40 and 42 urge the cut workpieces 26A and 26B apart as indicated by arrows 48 and 50. This gentle urging apart of the workpiece segments 26A and 26B ensures that they do not bind against the saw blade 22 to ensure optimum functioning of the saw blade and as well minimize gouging cut marks on the edges 44 and 46 of the kerf. The winged portions 40 and 42 by virtue of their design have outwardly flared portions 52 and 54 which are capable of biting into the edges 44 and 46 of the kerf, should there be an attempt to draw the workpiece back in the direction of rotation of the saw blade or in the event of kick back as caused by the saw blade engaging the kerf. Hence the splitter device 24 not only functions to urge the sawed workpieces apart but at the same time provides an anti-kickback feature in a single unit.

Figure 4:
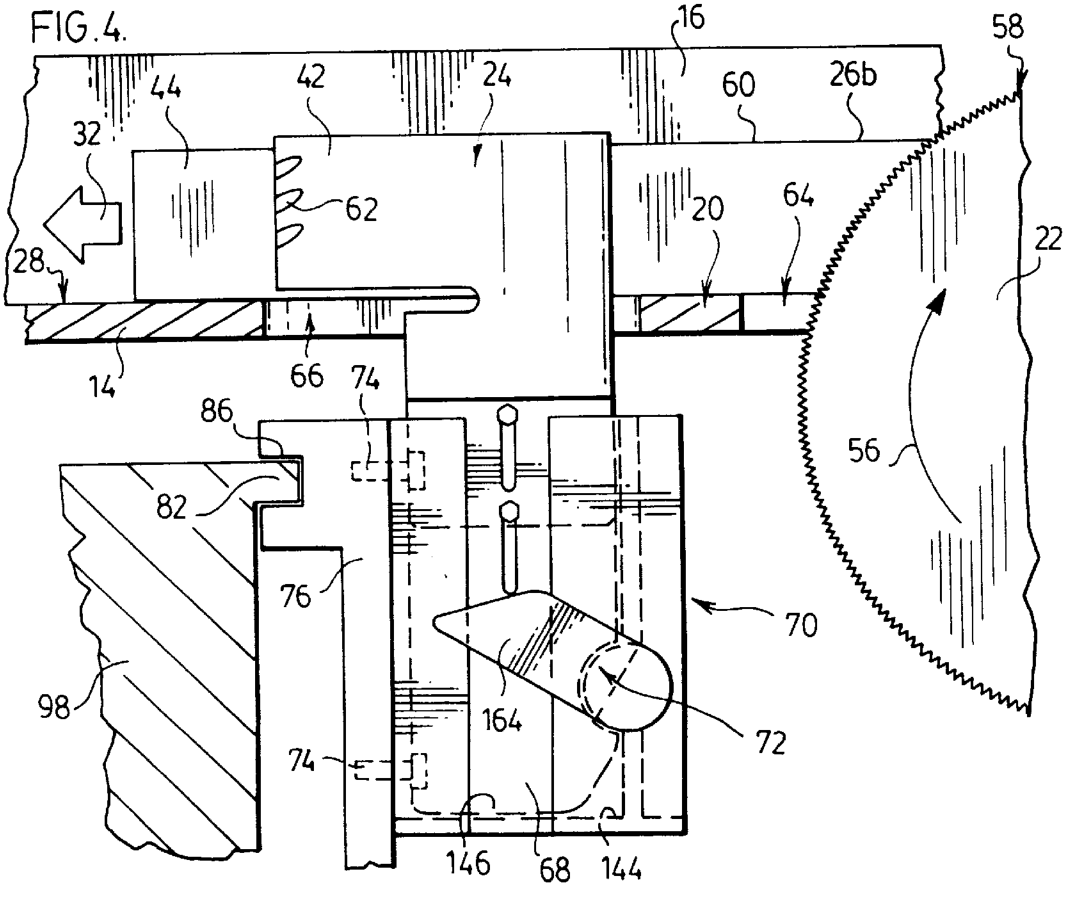
FIG. 4 is a section through the table saw of FIG. 1 showing the mounting of the splitter device downstream of the saw blade.

With reference to FIG. 4 the saw blade 22 is shown with its normal direction of rotation as indicated by arrow 56. The blade height as indicated by arrow 58 is above the upper surface 60 of the workpiece 26B adjacent the fence 16. The splitter device 24 may include as shown on wing 42 downwardly directed raised portions 62 which urge the workpiece 26 downwardly onto the table top 28. This ensures that the workpiece does not ride up on fence 16 due to the direction of rotation 56 of the saw blade 22.

The saw blade projects through an opening 64 of the throat plate 20. Downstream of opening 64 is a second opening 66 for the splitter device 24. The splitter device 24 is mounted on a stem 68 in the manner to be described with respect to FIG. 7. The stem is inserted in a slide 70 which includes a detent 72. The detent engages the stem 68 to lock the splitter device 24 in position above the throat plate 20. The slide 70 is secured by fasteners 74 to the trunnion 76 which in turn is mounted on trunnion race 78. This ensures that as the table saw blade 22 is tilted in a manner to be discussed with respect to FIG. 5 the splitter device 24 follows the tilt of the saw blade and hence the angle of the kerf 34.

Figure 5:
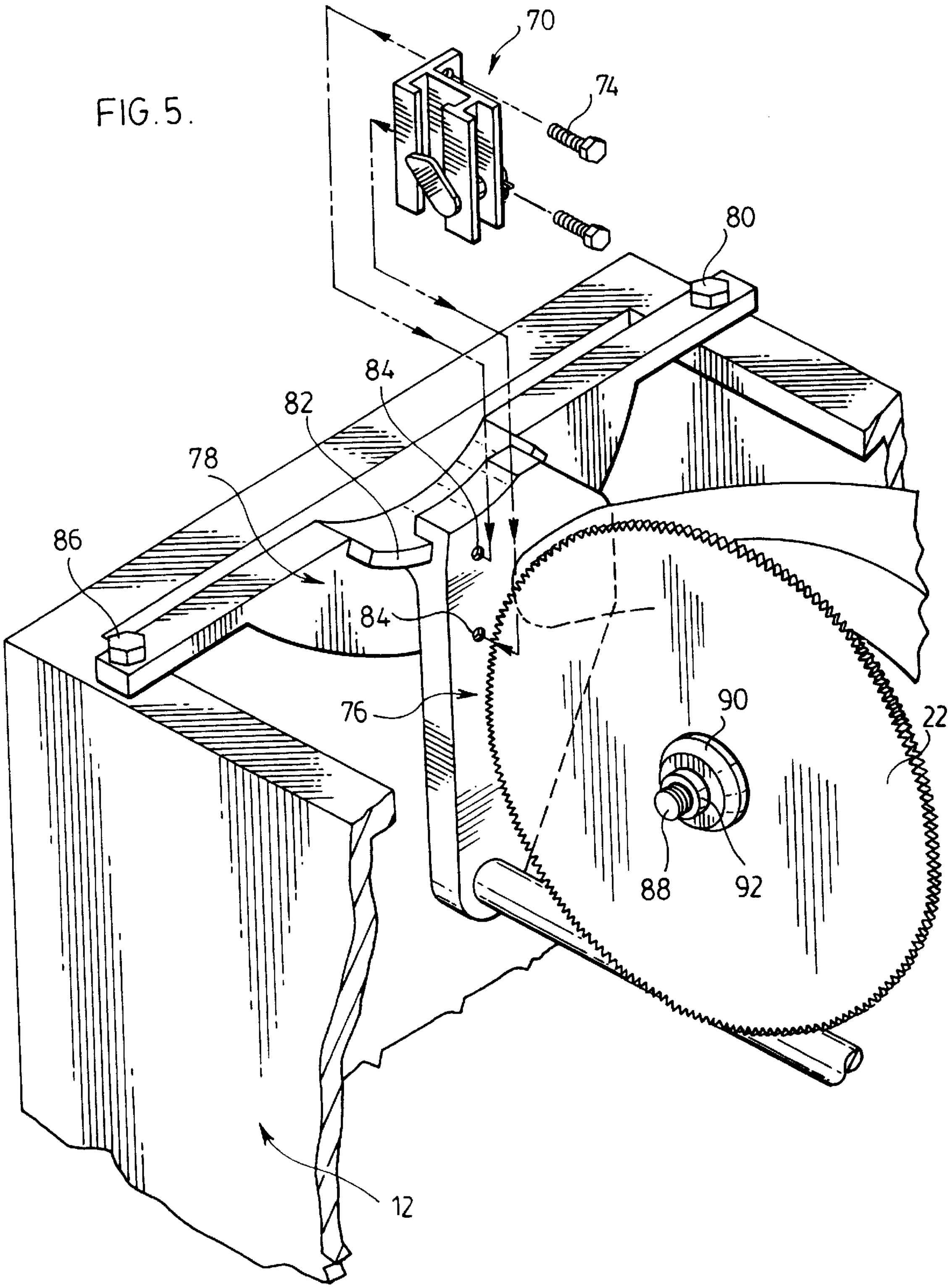
FIG. 5 is a partial perspective view of the positioning of the splitter device on the arbor of the table saw.

In FIG. 5 the table saw base 12 has the trunnion race 78 secured thereto by fasteners 80. The trunnion 76 engages the arcuate race portion 82 in the usual manner. This allows in the usual way tilting of the saw blade 22 about a horizontal axis. The fasteners 74 secure the slide 70 to the trunnion 76 by threading into fastener holes 84. As previously mentioned this ensures that the splitter device tilts in unison with the saw blade 22 so that the splitter device is always aligned with the angle of the kerf. As noted in respect of FIG. 4, the trunnion 76 includes an arcuate channel 86 which mates with the arcuate race 82 to provide the necessary guidance in tilting the saw blade 22. In the usual manner the saw blade 22 is mounted on arbor 88 and secured by the usual washers 90 and 92.

Figure 6:
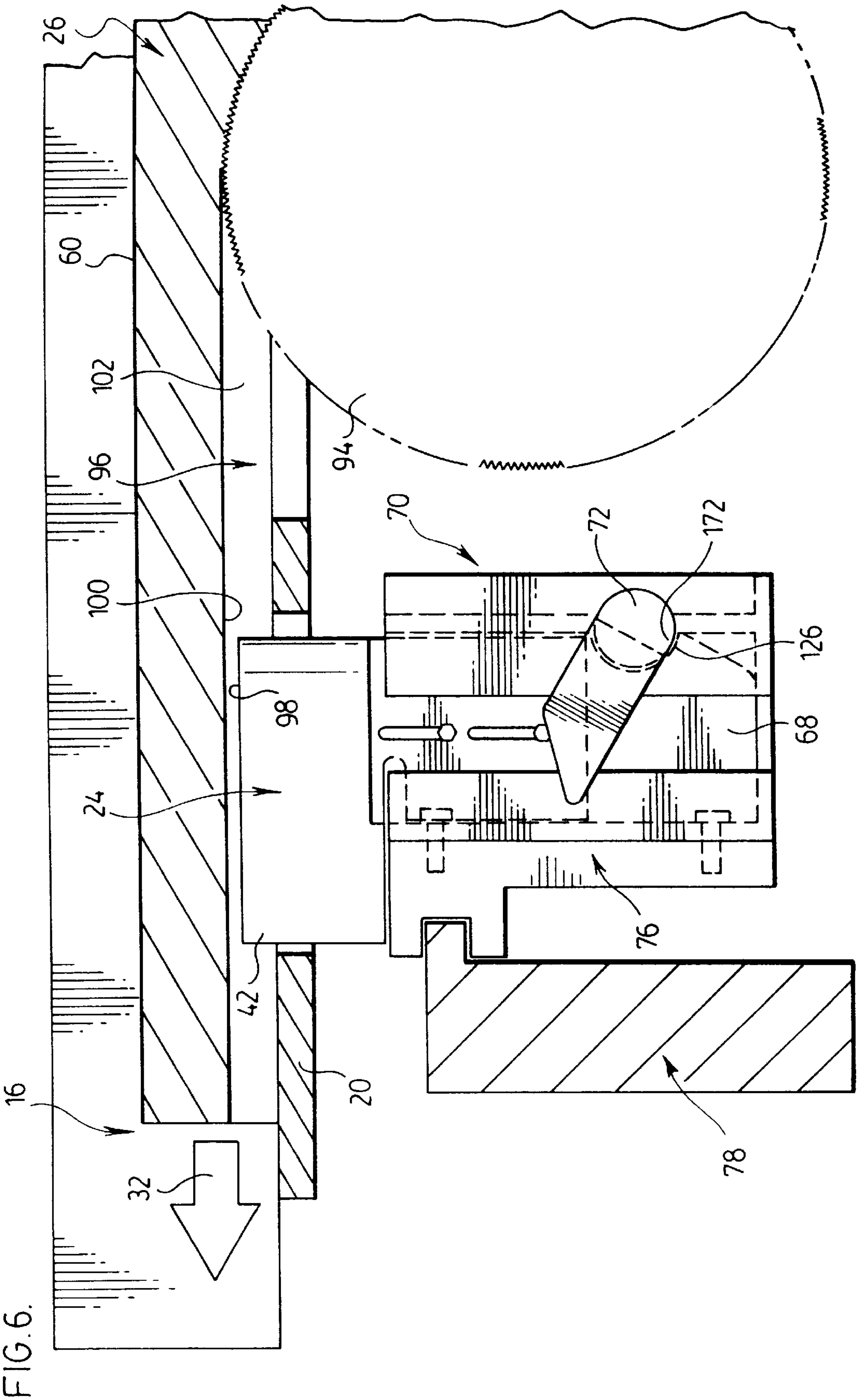
FIG. 6 is a section of the table saw showing the mounting of the splitter device for use in making a dado cut.

A significant feature of the splitter device of this invention is that various sizes in terms of widths and heights for the splitter device may be provided in an accessory package or kit. The use of such kit will be described with respect to FIGS. 6 through 10. A selected height for the splitter device functions surprisingly well when dado cuts are being formed in the workpiece 26 as shown in FIG. 6. A dado blade 94 forms a dado cut 96 in the workpiece 26. The height of the splitter device 24 above the throat plate 20 is selected so that the upper edge 98 of the splitter device is beneath and spaced apart from the internal base edge 100 of the dado cut 96. Hence as the workpiece 26 is advanced in the direction of arrow 32 the splitter device sits within the dado grove 96. The splitter device 24 has its wing tipped portions 40 and 42 sized so as to engage the edges 102 of the dado cut 96 and thereby provide anti-kickback feature. It is appreciated that various heights for the splitter device may be provided in an accessory kit along with various widths to accommodate various heights and widths of dado cuts. This is a significant feature of the splitter device since it can provide anti-kickback feature within the dado cut which has not been achievable by prior art devices. Instead prior art devices achieve anti-kickback by engaging the upper surface 60 of the workpiece which can result in marring of the workpiece finish should there be a kickback during the dado operation.

Figure 7:
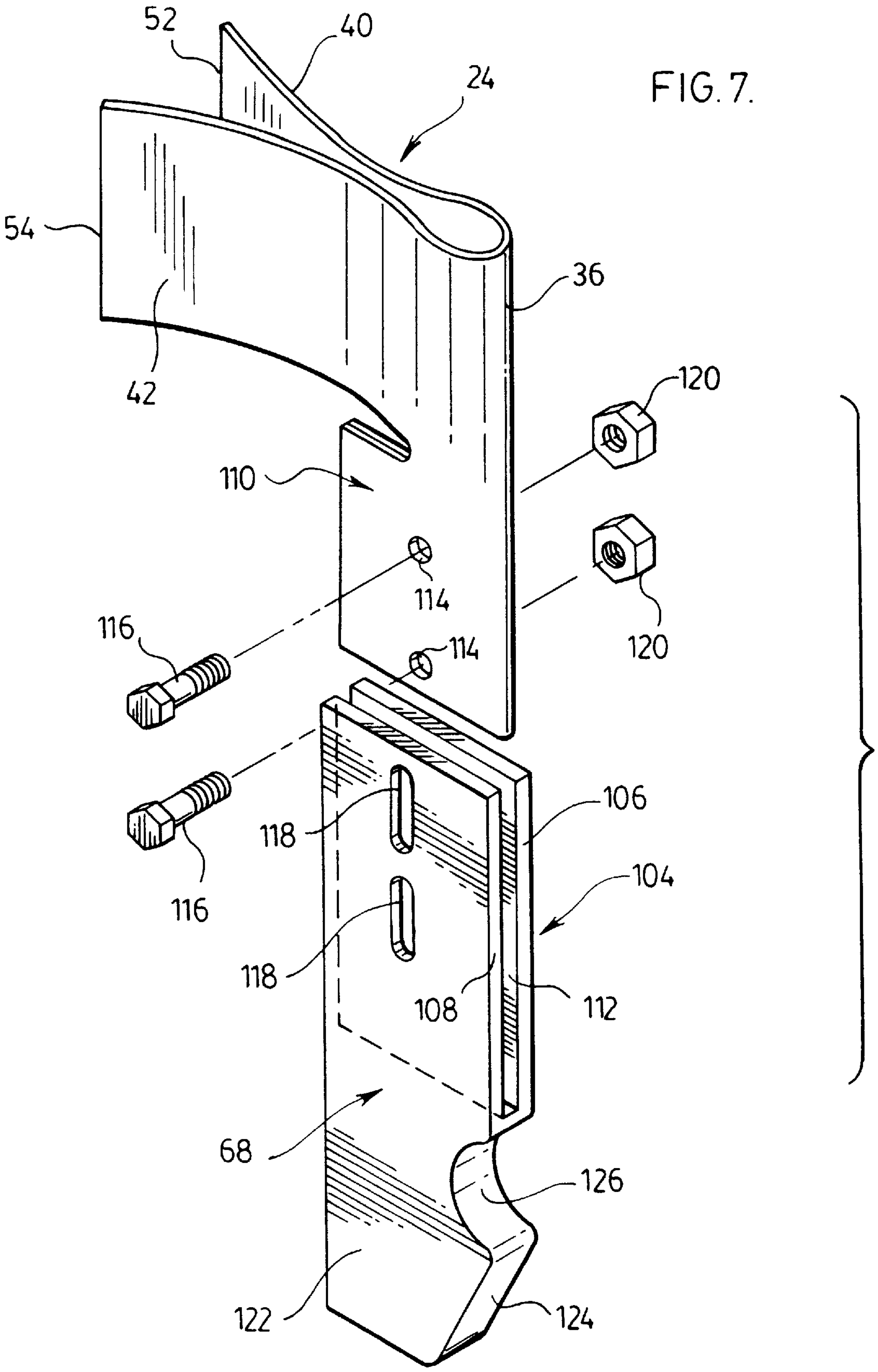
FIG. 7 is an exploded perspective view of the splitter device and mounting stem.

The securement device in accordance with this invention is described with respect to the use of a splitter device. It is appreciated however that the securement device may be used with any type of table saw accessory which requires a quick connect/disconnect securement to the table saw and where such securement is sturdy, easy to disconnect and provides a secure connection with little tolerance, hence reduced play of accessory during use. With reference to FIG. 7 an example of how the splitter device may be connected to the securement device is described. It is understood that there are several other ways in which a connection could be made as would be readily apparent to those skilled in the art. In accordance with this particular embodiment, the securement device includes a stem 68 which is bifurcated at 104 to provide opposing legs 106 and 108. The splitter device 24 has an integral depending leg 110 which is of a width for fitting snugly in the space 112 between opposing legs 106 and 108 of the stem 68. The leg 110 is provided with apertures 114 through which fasteners 116 extend. Vertically aligned elongate slots 118 are provided in the legs 106 and 108 to provide a degree of vertical adjustment for the splitter device 24 when secured to the stem 68. Bolts 120 complete the attachment of the leg 110 to the stem 68. The lower portion 122 of the stem 68 includes a tapered lead-in portion 124 in advance of the arcuate undercut 126 which engages the detent 72 of the slide 70. Such co-operation will be described in more detail with respect to FIGS. 8 through 10.

It is appreciated that other types of table saw accessories may be mounted on the stem 68 for connection to the table saw. It is also understood that by virtue of the vertically extending slots 118 the vertical height of the splitter device 24 may be adjusted. This is particularly desirable when making dado cuts so as to accommodate varying depth of such dado cuts and thereby ensure that the workpiece slides smoothly along the top work surface of the table saw.

Figure 8:
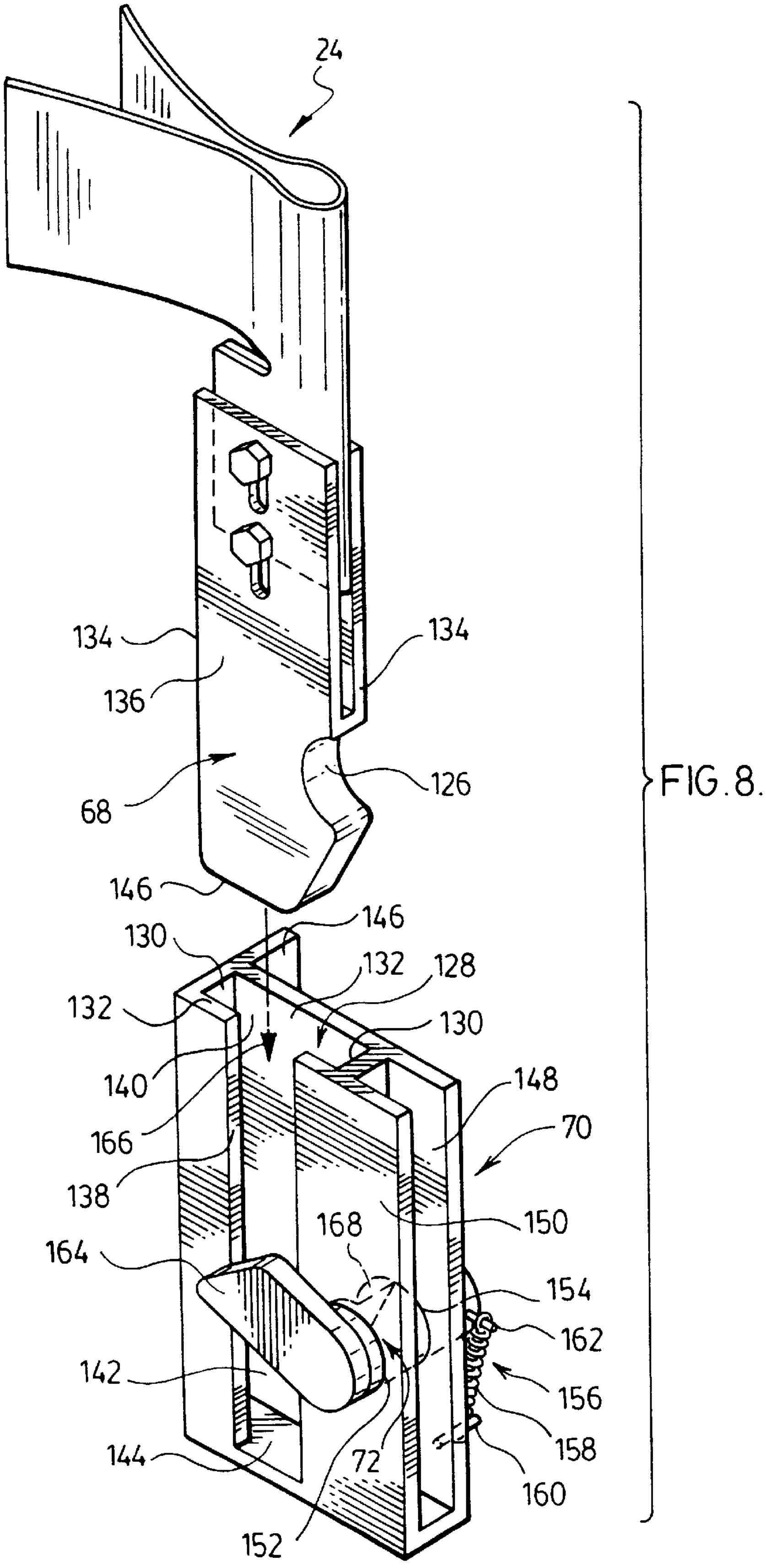
FIG. 8 is an exploded perspective view of the splitter and stem for mounting in a releasable slide.
Figure 9:
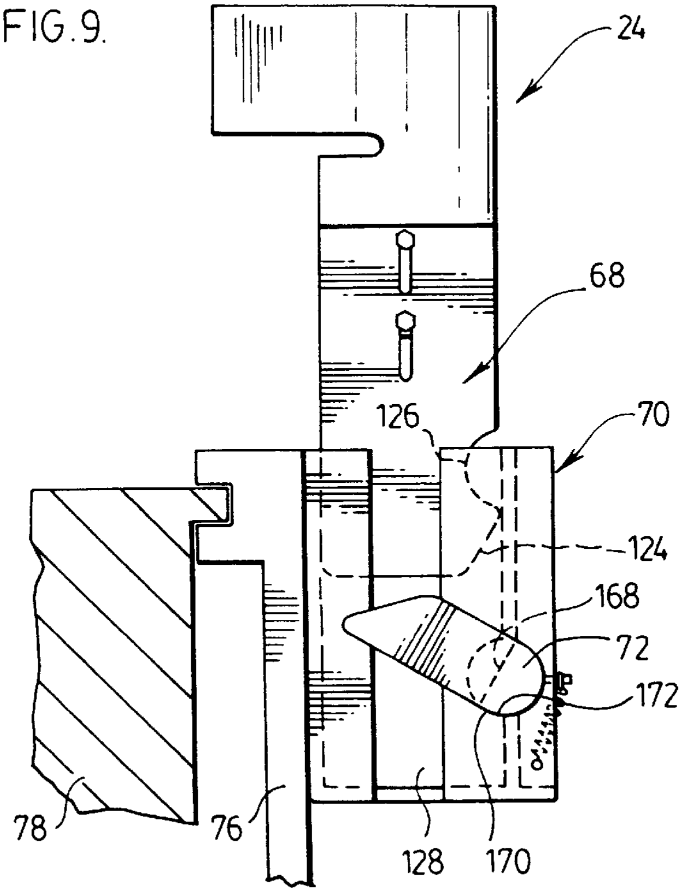
FIGS. 9 and 10 are side views of the slide showing sequential insertion of stem into the slide and corresponding action of the detent.
Figure 10:
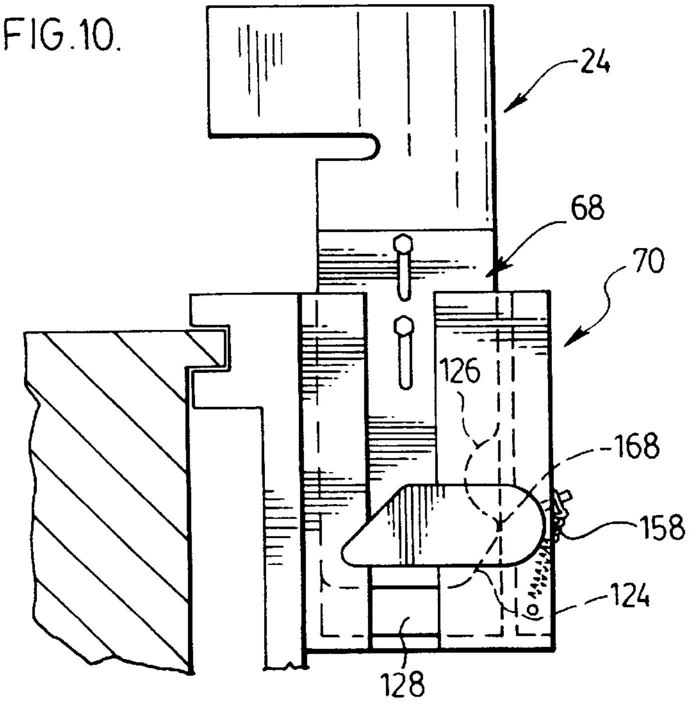

The operation of the securement device accessories such as the splitter device is described in more detail with respect to FIGS. 8 through 10. The slide 70 for receiving the stem 68 which carries the table saw accessory is machined to provide a longitudinally extending blind end bore 128. The bore 128 is precisely machined to resemble the cross-section of the stem above the undercut 126. In this particular embodiment the stem above the under cut 126 is rectangular. The bore 128 has a length dimension between ends 130 which snugly receive the corresponding ends 134 of the stem. The bore 128 has a width between the side walls 132 which snugly receives the thickness between the corresponding side walls 136 of the stem. In this particular embodiment the bore 128 has a slot 138 provided therein which extends from the upper portion 140 of the bore down to its lower portion 142 of the bore. The bore has a blind end defined by the base 144 of the slide 70 which in this embodiment is flat and is designed to abut the flat bottom portion 146 of the stem. The slide 170 includes a wing portion 146 which has suitable bores provided therein to facilitate the use of fastener 74 in securing the slides of the trunnion as described with respect FIG. 5.

The slide 70 includes integral detent mounting plates 148 and 150. The detent 72 is mounted in bores 152 and 154 provided in the mounting plates 148 and 150. The detent 72 is therefore permitted to rotate in the bores 152 and 154. The detent 72 is provided with a biasing device 156 which biases the detent to its locked position. In this particular embodiment the biasing device 156 comprises a spring 158 stretch between fixed pin 160 and pin 162 mounted in the detent 72. Secured to the detent 72 is manually actuatable arm 164 which allows the operator to manually depress the arm 164 to release the detent 72 and allow removal of the stem from the slide. In use the stem 68 is inserted downwardly in the direction of arrow 166 into the bore 128 where it is snugly received although it is understood that with suitable lubricant and/or machined surfaces the stem 68 slides smoothly into the bore. As shown in FIG. 9 the lead-in portion 124 advances towards the detent 72 as the stem 68 is advanced in the bore 128. The detent 72 includes a flat 168 machined in the surface thereof which is also shown in FIG. 8. The orientation of the flat as shown in FIG. 9 slopes generally upwardly but at an angle similar to the angle of lead-in portion 124. As the stem 68 is pushed further downwardly in the bore 128 the lead-in portion 124 engages the flat 168 and rotates the detent to the position shown in FIG. 10 such that the undercut 126 passes beneath the lower edge 170 of the flat 168. This allows the detent to rotate under the biased of spring 158 to its locked position where the under cut now engages the lower cylindrical portion 172 of the detent. This locked position is shown more clearly in FIGS. 4 and 6 where the under cut 126 snugly engages the lower cylindrical portion 172 of the detent so as to lock the stem 68 within the slide 70. It will be noted in FIGS. 4 and 6 that the base portion 146 abuts the bottom 144 of the bore to further snug up the securement of the stem in the bore. This ensures an accurate positioning of the saw accessory such as the splitter device 24 with minimal play in the device during use. It is appreciated that various alternatives are available for locating the base portion in the bottom of the bore. For example the a ratchet system may be incorporated in the base of the slide to provide various height locations for the splitter depending on the type of saw cut being made and its corresponding depth in the workpiece.

After the splitter device is located, the throat plate 20 is replaced and the sawing operation commenced. When it is desired to remove the splitter device and replace it with another splitter device or another accessory the throat plate is lifted from the table saw and the operator simply depresses the lever or arm 164 in the downward direction such that the detent flat 168 assumes the position as shown in FIG. 10 so that the operator can then readily withdraw the splitter device along with stem 68 from the bore 128. It is also possible to modify the throat plate to provide access to the release for the stem of the splitter device such as a hole provided in the throat plate which provides access to the release mechanism and allows withdrawal of the stem from the slide. This type of set up is particularly useful with the style of dado throat plate which must be secured in place by a fastener and cannot be removed without taking out the fastener first.

With this type of quick disconnect for the table saw accessory such as the splitter device, a variety of table saw accessories may be provided in kit form. In particular with respect to the splitter device the kit may include splitters of varying widths and heights to accommodate varying saw blade widths as well as varying depths of dado grooves. The anti-kickback feature of the splitter device relies on direct engagement with the side walls of the kerf or dado cut without interfering with or causing any marring of the upper surface of the workpiece. In the event that there is kickback the splitter device engages the saw kerf edges which are normally the unexposed portions of the finished workpiece. In the event that there is kick back to the extent to which the splitter device cuts into the kerf side walls is minimal so that sanding can readily remove any imperfections should kick back occur. The ease with which the securing device functions allows the operator to readily replace or interchange splitter devices with minimal effort and no disassembly of a table saw. It is routine for an operator to remove the throat plate of a table saw as is commonly done for example in replacing blades and/or inserting dado blades.

Although preferred embodiments of the invention have been described herein in detail, it will be understood by those skilled in the art that variations may be made thereto without departing from the spirit of the invention or the scope of the claims.

What is claimed is:

1. A device for securing a table saw accessory downstream of a saw blade, said device comprising:

i) a mount for securing said device to a table saw beneath a throat plate of table saw;

ii) a slide for receiving a stem carrying a table saw accessory;

iii) a releasable detent for capturing such stem and holding a table saw accessory in place;

iv) an actuator for releasing said detent, said actuator being actuated from directly above and moveable downwardly vertically to release said detent.

2. A device of claim 1 wherein said detent receives such stem and is displaced upon insertion of such stem in said slide and snap fits into cooperating detent component on such stem to capture such stem.

3. A device of claim 2 wherein said detent is a rotatable cam biased to a home position for recapturing such stem.

4. A device of claim 3 wherein said actuator is a lever which is connected to said cam and is movable downwardly to release said detent.

5. A device of claim 1 in combination with a table saw accessory carried by a stem, said stem having a detent component for cooperating with said detent, said component snapping into said detent upon downward insertion of said stem into said slide.

6. A device of claim 5 wherein said accessory is a splitter for alignment with a saw blade kerf.

7. A device of claim 6 wherein said splitter comprises a range of splitter sizes, each provided on a separate stem for quick disconnect and replacement with a different size splitter.

8. A device of claim 6 mounted on table saw beneath a throat plate of said table saw, said mount being secured to an arbor of said table saw so as to tilt with a saw blade of said table saw.

9. A device of claim 6 wherein said cam has a flat which is engaged by said stem on downward insertion of said stem into said slide, said cam rotating to allow said stem to pass along side said cam, said cam rotating back to a home position when said cam encounters said detent component on said stem.

10. A device of claim 9 wherein said detent component is a recess which cooperates with said cam profile to lock and capture said stem in place.

11. A device of claim 10 wherein said stem has a rounded lower portion for engaging said cam flat.

12. A device of claim 6 wherein said splitter comprises a bulging nose portion, a reduced intermediate portion and outwardly biased, outwardly flared opposing wing portions for continuously engaging sides of a saw kerf in a workpiece.

13. A device of claim 12 wherein said flared wing portions have tips which bit into saw kerf sides in event of saw blade kick back.

14. A device of claim 13 wherein said wing tip portions have downwardly directed raised portions to effect hold down of a work piece as it travels by said splitter.

15. A device of claim 12 wherein said splitter is formed from spring steel.

16. A splitter for use on a table saw comprising a bulging nose portion, a reduced intermediate portion and outwardly biased, outwardly flared opposing wing portions for continuously engaging sides of a saw kerf in a workpiece.

17. A splitter of claim 16 wherein said flared wing portions have tips which bit into saw kerf sides in event of saw blade kick back.

18. A splitter of claim 17 wherein said wing tip portions have downwardly directed raised portions to effect hold down of a work piece as it travels by said splitter.

19. A splitter of claim 16 of formed from spring steel.

20. A splitter of claim 16 of predetermined height to accommodate a dado cut of predetermined height.

21. A splitter claim 16 of predetermined width at said opposing wing portions to accommodate a kerf of predetermined width.

* * * * *